(12) United States Patent
Gill (10) Patent No.: US 12,453,784 B2
(45) Date of Patent: Oct. 28, 2025

(54) BIOLOGICALLY INERT FLUID FOR USE IN THE TREATMENT OF A CNS DISORDER

(71) Applicant: XCED LLP, London (GB)

(72) Inventor: Steven S. Gill, Bristol (GB)

(73) Assignee: NEUROCHASE INNOVATIONS LTD, Cardiff (GB)

( * ) Notice: Subject to any disclaimer, the term of this patent is extended or adjusted under 35 U.S.C. 154(b) by 999 days.

(21) Appl. No.: 17/264,973

(22) PCT Filed: Aug. 5, 2019

(86) PCT No.: PCT/GB2019/052187
§ 371 (c)(1),
(2) Date: Feb. 1, 2021

(87) PCT Pub. No.: WO2020/030892
PCT Pub. Date: Feb. 13, 2020

(65) Prior Publication Data
US 2021/0260220 A1   Aug. 26, 2021

(30) Foreign Application Priority Data
Aug. 6, 2018   (GB) .................................... 1812746

(51) Int. Cl.
*A61K 48/00*   (2006.01)
*A61K 9/00*    (2006.01)
(Continued)

(52) U.S. Cl.
CPC ........ *A61K 48/0083* (2013.01); *A61K 9/0019* (2013.01); *A61K 47/02* (2013.01); *A61K 47/46* (2013.01); *A61M 5/1409* (2013.01); *A61M 5/158* (2013.01); *A61P 21/00* (2018.01); *A61P 25/08* (2018.01); *A61P 25/28* (2018.01); *A61P 43/00* (2018.01); *A61M 2210/0693* (2013.01)

(58) Field of Classification Search
CPC .. A61K 48/0083; A61K 9/0019; A61K 47/02; A61K 47/46; A61M 5/1409; A61M 5/158; A61M 2210/0693; A61P 21/00; A61P 25/08; A61P 25/28; A61P 43/00
See application file for complete search history.

(56) References Cited

U.S. PATENT DOCUMENTS

| 9,700,587 B2* | 7/2017 | Gill | A61K 48/0075 |
| 2015/0165166 A1* | 6/2015 | Gill | A61B 17/3415 604/164.01 |
| 2019/0111135 A1* | 4/2019 | Guler | A61K 38/1709 |

FOREIGN PATENT DOCUMENTS

WO   2014184576 A1   11/2014

OTHER PUBLICATIONS

Motion JP, Huynh GH, Szoka FC Jr, Siegel RA. Convection and retro-convection enhanced delivery: some theoretical considerations related to drug targeting. Pharm Res. Mar. 2011;28(3):472-9. doi: 10.1007/s11095-010-0296-2. Epub Oct. 21, 2010. PMID: 20963628; PMCID: PMC3044083. (Year: 2010).*

(Continued)

*Primary Examiner* — William R Carpenter
(74) *Attorney, Agent, or Firm* — Boulware & Valoir PLLC (57) ABSTRACT

The present invention provides a biologically inert fluid for use in the treatment of a CNS disorder, wherein the biologically inert fluid is to be infused into the brain via convection enhanced delivery (CED) in combination with a therapeutic agent.

14 Claims, 8 Drawing Sheets

(51) Int. Cl.

| | |
|---|---|
| *A61K 47/02* | (2006.01) |
| *A61K 47/46* | (2006.01) |
| *A61M 5/14* | (2006.01) |
| *A61M 5/158* | (2006.01) |
| *A61P 21/00* | (2006.01) |
| *A61P 25/08* | (2006.01) |
| *A61P 25/28* | (2006.01) |
| *A61P 43/00* | (2006.01) |

(56) References Cited

OTHER PUBLICATIONS

Barua et al. Convection-Enhanced Delivery of AAV2 in White Matter—A Novel Method for Gene Delivery to Cerebral Cortex, 2013, Journal of Neuroscience Methods, 220, 1-8 (Year: 2013).*
Motion, J. P Michael, et al., Convection and Retro Convection Enhanced Delivery: Some Theoretical Considerations Related to Drug Targeting, Pharmaceutical Research (2011) 28:472-479.
Zhou, Jiangbing, et al., Highly Penetrative, Drug-loaded Nanocarriers Improve Treatment of Glioblastoma, Proceedings of the National Academy of Sciences of the United States of America, Jul. 16, 2013, vol. 110, No. 29, 11751-11756.
UK Search Report issued in UK Application 1812746.4, filed Aug. 6, 2018.
International Search Report and Written Opinion issued in PCT/GB2019/052187, filed Aug. 5, 2019 (May 8, 2019).

* cited by examiner

BIOLOGICALLY INERT FLUID FOR USE IN THE TREATMENT OF A CNS DISORDER

FIELD OF INVENTION

The present invention relates to improving convection enhanced delivery (CED) of therapeutic agents into the brain.

BACKGROUND TO THE INVENTION

An important limitation to the treatment of neurological disease is the presence of the blood-brain-barrier (BBB) which prevents many systemically administered therapeutic agents from reaching effective concentrations in the central nervous system (CNS). It is also desirable to deliver many therapies to discrete targets within the CNS to limit side effects or toxicity. However, the therapeutic efficacy of drugs injected into the brain parenchyma is limited by minimal diffusion from the site of injection and consequently, small volumes of distribution. In 1994, the concept of convection enhanced delivery (CED) of drugs was introduced (Bobo et al 1994). This describes the infusion of drugs under controlled pressure to the brain parenchyma via targeted micro-catheters (Panse et al 2010). The infusate carries drugs by bulk flow, displacing extracellular fluid and achieving a homogenous drug concentration within the infused brain volume. CED facilitates the accurate anatomical targeting and delivery of higher (therapeutic) drug concentrations through clinically relevant volumes of brain tissue or tumour. The BBB can now operate to retain drugs within the brain and to significantly reduce systemic side effects. CED has been extensively investigated in the context of a wide range of CNS disorders in both pre-clinical and clinical trials-most notably for the treatment of brain tumours and Parkinson's disease.

The ability to repeatedly administer drugs by CED to the same target volume without the need for further surgery is vital to make the most of this novel therapeutic approach to CNS disease. This is especially important when treating malignant tumours, as repeated exposure to chemotherapy is essential to ensure that cells are adequately exposed to the drug. The development of an implantable drug delivery system has made this possible. The device comprises 4 micro-infusion catheters that are delivered stereotactically to deep subcortical targets. These are connected to independent channels in a septum sealed, bone-anchored transcutaneous port that emerges through the scalp over the parietal region. Drugs can be infused down each catheter at any time by reversibly connecting a drug administration set to the port and by turning an actuator, 4 needles are driven through the septum that connects each catheter to an independent external drug infusion pump. This drug delivery system has been used to deliver the neurotrophin, glial cell line-derived neurotrophic factor (GDNF), to the striatum in 42 patients with Parkinson's disease on a monthly basis for over 18 months in a phase II trial. It has also been used successfully to repeatedly deliver chemotherapy into the brain parenchyma in 5 adults and 21 children with high grade gliomas on compassionate grounds.

Brain tumours may also be treated with the direct infusion of therapeutic agents into the brain parenchyma. These include conventional chemotherapy, Auger electron emitters, immunotoxins, molecular targeted therapies, monoclonal antibodies, oncolytic viruses and gene therapies. In these circumstances spread of the therapeutic agent into critical structures such as the medulla when infusing into the pons to treat diffuse intrinsic pontine glioma could cause life threatening toxic effects.

To address the need to confine a therapy within a brain tumour, Motion et al. describe the use of one or more catheters to deliver a drug directly into a tumour volume whilst one or more catheters deliver an inert fluid into adjacent tissue. They argue that with precise positioning of the catheters and taking into account differences in tissue permeability, capillary densities etc. between the tumour and surrounding tissue, it should be possible, by carefully adjusting the catheter flow rates, to contain a drug within the boundary of a tumour if the boundary coincides with the collision surfaces of the infused drug and the infused inert fluid. Using a similar rationale and multi-catheter delivery, a drug (a radio-protective agent) may be infused into tissue surrounding a brain tumour whilst infusing an inert fluid into the tumour to fill its volume. When the patient is then irradiated the normal tissue but not the tumour is protected from the effects of radiation.

The delivery of therapeutic agents directly to the brain parenchyma by CED has important application in the treatment of neurodegenerative disease. This is because many potential therapies such as neurotrophins, gene therapies, enzymes, immune-therapy, SiRNAs, antisense oligonucleotides etc. do not cross the blood-brain barrier. Neurodegenerative diseases include Alzheimer's disease, Amyotrophic lateral sclerosis, Corticobasal degeneration, Multi System Atrophy, Friedreich's Ataxia, Huntington's disease, Lewy body disease, Parkinson's disease, Parkinson's plus syndromes, Enzyme deficiency syndromes, Lysosomal Storage diseases, Spinal muscular atrophy, Prion diseases and others.

These diseases typically involve large volumes of the CNS and in some cases the disease affects the whole of the CNS. Indeed, there are many neurological diseases which may be effectively treated by infusing a therapeutic agent, and particularly gene therapies, directly into the cortex. Typically the therapy needs to be delivered to large volumes of the cortex, for example the whole motor cortex in the case of motor neuron disease or spinal muscular atrophy, the frontal and temporal lobes in the case of fronto-temporal dementia, and the whole cortex for lysosomal storage diseases. The cortex of the human brain is a highly convoluted structure measuring 1-4.5 mm in thickness. Consequently, to infuse a therapeutic agent directly into clinically meaningful cortical volumes will require multiple punctures of the cortex. This will pose an unacceptable risk of direct cortical injury or haemorrhage. Delivery of therapies by direct parenchymal infusion to large volumes of the cerebral cortex, be it to the motor cortex or indeed to the whole brain cortex is therefore desirable but technically challenging due to the convoluted morphology of the cerebral cortex. Delivery of viral vectors to the cortex by infusion into the subcortical white matter has previously been described (WO2014/184576). However, infusate carrying the therapy will preferentially follow the path of least resistance through the white matter (because the interstitial space in white matter is at least twice that of grey matter) and be predominantly confined to the white matter, with proportionately less of the infusate penetrating the grey matter.

The treatment of epilepsy and movement disorders with the direct infusion of Botulinum toxin into targeted volumes of the brain parenchyma has been described (US20080160121). Botulinum toxin type A when infused into the brain parenchyma reversibly inhibits the release of neurotransmitters including acetylcholine, norepinephrine, and glutamate for a period of 2 to 6 months controlling symptoms for this period. Botulinum toxin delivered outside of the desired treatment volume will deactivate neurons in these volumes producing unwanted side effects. An example would be the inadvertent spread of infusate carrying Botulinum toxin into the hippocampus when treating medial temporal lobe epilepsy. This may significantly impair short term memory for 2-6 months.

In the above examples it is evident that there is a need for improved methods of delivering the required concentration of therapeutic agent to the region of the brain where it is needed. A problem that has not yet been addressed is how to deliver drugs into therapeutically relevant volumes of the cortex, which is often considered to be difficult to access due to its relatively large size and convoluted structure.

SUMMARY OF THE INVENTION

The present inventor has recognised that when infusing therapeutic agents directly into the brain parenchyma to treat CNS disorders improved treatment can be provided by steering and/or driving the flow of the infused therapy so that it can be shaped to conform to the desired treatment volume, and in doing so be constrained from flowing into brain volumes where side effects may be induced. This has been achieved by providing a biologically inert fluid for use in the treatment of a CNS disorder, wherein the biologically inert fluid is to be infused into the brain via convection enhanced delivery (CED) in combination with a therapeutic agent.

The present invention provides a method wherein the volume of delivery of the infused therapy can be shaped to conform to a target region of the brain by the co-infusion of biologically inert fluid through one or more strategically placed catheters. Biologically inert fluid infused from the catheter(s) will create a pressure gradient to counteract the flow of the co-infused therapeutic agent being driven away from the target area of the brain. The pressure gradient generated from the biologically inert fluid infusion can thereby create a barrier limiting the loss of therapy into deep white matter of the brain and may also be employed to drive the therapy into cortical grey matter. This strategy will limit the total dose of therapeutic agent that needs to be administered to achieve coverage of the target area and thereby reduce the likelihood of toxicity. The therapeutic agent can therefore be dynamically driven into the target areas of the brain, facilitating targeting of large and/or complex structures such as the cortex. The methods of the present invention can therefore address the problem of how to deliver a therapeutic agent to clinically meaningful cortical volumes whilst minimising loss of the therapeutic agent in the white matter.

In a further embodiment of the invention biologically inert fluid can be infused down a catheter following the infusion of the therapeutic agent down the same catheter. In this instance the pressure gradient generated by the infused biologically inert fluid will drive the therapeutic agent radially from the catheter. Where the catheter is placed in subcortical white matter this could be a means by which the therapy is driven into cortical grey matter and greatly reduce the drug volume retained in the white matter. In other words, as with the previous embodiment, the biologically inert fluid can be used to drive the therapeutic agent from subcortical white matter into cortical grey matter, thereby targeting the cortex. Using this method it may be possible to deliver the therapeutic agent to the whole cortex, or to specific parts thereof, as desired. Until now this has been difficult to achieve due to the relatively large size and convoluted structure of the cortex.

Additionally or alternatively, biologically inert fluid may be infused through a catheter, or catheters, in conjunction with infusions of a therapeutic agent and then, when the therapeutic dose has been delivered to continue to infuse biologically inert fluid alone down all the catheters. This combination of infusions can direct a greater portion of the therapy into the target region of the brain.

DESCRIPTION

As explained above, the present inventor has recognised that when infusing therapeutic agents directly into the brain parenchyma to treat CNS disorders improved treatment can be provided by steering and/or driving the flow of the infused therapy so that it can be shaped to conform to the desired treatment volume, and in doing so be constrained from flowing into brain volumes where side effects may be induced. In an example of delivering a therapy into the whole human cortex by infusion through multiple catheters implanted in the white matter, which illustrates the some of the problems associated with current techniques, the theoretical distribution of the infusate would be as follows:—

The volume of the human brain neocortical grey matter is 673 cm$^3$+/−64 cm$^3$ (Kennedy et al). The volume of distribution (Vd) of an infused drug in the grey matter extracellular space per volume infused (Vi) Vd/Vi is 5:1, thus to fill the whole cortical grey matter 135 ml of infusate would be required. With most therapies the critical layer of the cortex to reach is layer 5 and with sub cortical delivery the inventor estimates that the deepest half of the cortex would need to be infused. Thus to fill 50% of the cortical volume would require a Vi of 68 ml. The volume of the human white matter is approximately 390 cm$^3$ (420 cm$^3$+/−60 cm$^3$ in men and 360 ml+/−40 ml in women: Lüders et al). The Vd/Vi for white matter is 2:1, thus to fill the whole of the white matter, 195 ml of infusate would be required. Consequently, in this theoretical example, less than a third of the infused volume will be delivered to the cortical target and two thirds will be lost in the white matter. This exposes the patient to high total doses of therapy, increasing the risk of toxicity.

In the case of viral vector delivery high concentrations of vector in the range of $1\times10^{12}$ to $5\times10^{13}$ viral particles per ml may be required to achieve clinically effective transfection of the grey matter. When delivered to the sub-cortical white matter in order to achieve coverage of the convoluted cortical grey matter, the potential loss of ⅔rds of the infused dose into the white matter could expose the patient to potentially toxic doses of the vector and of provoking a life threatening immune response.

The present inventor has solved these problems by providing a biologically inert fluid for use in the treatment of a CNS disorder, wherein the biologically inert fluid is to be infused into the brain via convection enhanced delivery (CED) in combination with a therapeutic agent. The biologically inert fluid acts to steer and/or drive the flow of the infused therapeutic agent so that it can be shaped to conform to the desired treatment volume and in doing so be constrained from flowing into brain volumes where side effects may be induced.

The biologically inert fluid may be infused simultaneously or sequentially with the therapeutic agent. Sequential infusion refers to infusing the biologically inert fluid immediately prior to infusion of the therapeutic agent and/or immediately after infusion of the therapeutic agent. Sequential infusion may allow the biologically inert fluid and therapeutic agent to be infused via the same catheter. Typically, when administering the biologically inert fluid and the therapeutic agent simultaneously separate catheters will be used. Infusing the biologically inert fluid immediately before infusing therapeutic agent can create a pressure gradient that acts as a barrier to limit the loss of the therapeutic agent into the deep white matter. Co-infusing the biologically inert fluid simultaneously with the therapeutic agent and/or immediately after infusion of the therapeutic agent may help to drive the therapeutic agent into cortical grey matter of the brain. Sequential infusion of the biologically inert fluid after infusion of the therapeutic agent can reduce or prevent high concentrations of therapeutic agent that can accumulate around the catheter and/or can provide more homogenous distribution of the therapeutic agent though the target treatment area.

In embodiments of the invention the biologically inert fluid may be used to block the flow of infused therapies from entering critical brain volumes, e.g. the medulla when infusing the pons in diffuse intrinsic pontine glioma (DIPG), or unwanted brain volumes such as white matter. In this instance biologically inert fluid is infused into the critical structure or unwanted volume to block it from an influx of therapeutic agent.

The therapeutic agent and biologically inert fluid may be infused into subcortical white matter of the brain to deliver the therapeutic agent to the whole cortex or specific parts thereof, and/or to the spinal cord as desired. For example, the therapeutic agent and biologically inert fluid may be infused into the subcortical area (i.e., the subcortical white matter) of the brain to deliver the therapeutic agent to the frontal lobe cortex. The therapeutic agent and biologically inert fluid may be infused into the subcortical white matter of the brain to deliver the therapeutic agent to the whole motor cortex (e.g. in the case of motor neuron disease or spinal muscular atrophy), the frontal and/or temporal lobes (e.g. in the case of fronto-temporal dementia) or the whole cortex (e.g. in the case of lysosomal storage diseases). Other areas of the cortex that may be targeted for delivery of the therapeutic agent include the visual cortex, the auditory cortex, the sensory cortex and/or the associative cortex. In embodiments of the invention, the therapeutic agent may be delivered into the whole or parts of: the grey matter of the frontal cortex; the occipital, parietal and temporal lobes (including the medial temporal lobes) or combinations thereof; or to the whole brain including the cerebellum. Additionally or alternatively, the therapeutic agent and biologically inert fluid may be infused into the subcortical white matter of the brain to deliver the therapeutic agent to the spinal cord, including one or more of the corticospinal tract, the reticulospinal tract and/or the anterior horn cells.

Biologically inert fluid refers to a fluid which does not initiate a response or interact when introduced to biological tissue. The biologically inert fluid may be selected from one or more of phosphate buffered saline (PBS) or artificial cerebrospinal fluid (aCSF). In preferred embodiments of the invention the biologically inert fluid is aCSF.

Artificial cerebrospinal fluid (aCSF) as used in the present invention may comprise ionic constituents. Preferably the aCSF comprises NaCl at a similar concentration to that found in natural CSF, that is to say the concentration is preferably within 15%, more preferably within 10% of the concentration in natural CSF. Preferably the aCSF comprises $NaHCO_3$ at a similar concentration to that found in natural CSF, that is to say the concentration is preferably within 15%, more preferably within 10% of the concentration in natural CSF. Preferably the aCSF comprises KCl at a similar concentration to that found in natural CSF, that is to say the concentration is preferably within 15%, more preferably within 10% of the concentration in natural CSF. Preferably the aCSF comprises $NaH_2PO_4$ at a similar concentration to that found in natural CSF, that is to say the concentration is preferably within 15%, more preferably within 10% of the concentration in natural CSF. Preferably the aCSF comprises $MgCl_2$ at a similar concentration to that found in natural CSF, that is to say the concentration is preferably within 15%, more preferably within 10% of the concentration in natural CSF. The aCSF can comprise glucose at a similar concentration to that found in natural CSF, that is to say the concentration is within 15%, preferably within 10% of the concentration in natural CSF. Alternatively, the aCSF does not comprise glucose. Most preferably, the aCSF does not comprise proteins.

The therapeutic agent may be infused in the brain via an array of at least two or at least three catheters. For example, three or more catheters may be implanted in a fan-shaped array, e.g. on an antero-posterior trajectory under the frontal cortex with their entry points and the frontal pole and each catheter tip positioned beneath a target area of the cortex. The array may comprise one or more further catheters for infusing the therapeutic agent into the sub-cortical white matter of the orbito-fontal cortex with a fronto-polar entry point. Preferably, the array comprises at least one central catheter for administration of the biologically inert fluid. For example, the catheter for infusing the biologically inert fluid may be placed in the frontal white matter in an antero-posterior direction with an entry point at the frontal pole and distal end deep to the target cortex.

When infusing the therapeutic agent via an array of at least two or at least three catheters comprising at least one central catheter for administration of the biologically inert fluid, the biologically inert fluid may be infused through the central catheter prior to, simultaneously with and/or subsequent to infusion of the therapeutic agent. Alternatively, the therapeutic agent and biologically inert fluid may be infused sequentially through the same catheter.

Preferably, the biologically inert fluid and therapeutic agent are infused into the brain via one or more convection enhanced delivery (CED) catheters. In preferred embodiments of the invention the catheter has an external diameter of not more than 600 μm. Appropriate catheters are described in WO03/077785. Preferably the catheter is a reflux resistant catheter, such as a stepped catheter or recessed step catheter, e.g. as described in Gill et al (incorporated herein by reference). It may also comprise a port for connecting the catheters to a delivery device. Suitable ports are described in WO2008/062173 and WO2011/098769.

The biologically inert fluid may be infused at a flow rate of between 1 and 30 μL per minute, preferably between 5 and 15 μL per minute.

In embodiments of the invention each catheter may infuse about 1 ml to about 20 ml of biologically inert fluid, preferably about 5 ml to about 15 ml, more preferably about 5 ml to about 10 ml. Infusing smaller volumes of fluid (e.g. around 5 ml to around 10 ml) through multiple catheters may be more effective in filling large white matter volumes than attempting to fill the volume with fewer catheters each with higher flow rates or longer infusion times. Convection becomes less efficient the greater the volume infused per catheter because the pressure gradient needs to be higher to achieve homogenous distribution. High pressure at the catheter expands the interstitial space thereby decreasing Volume of distribution (Vd)/Volume of infusion (Vi) and potentially causing local tissue damage.

The biologically inert fluid and/or the therapeutic agent may be for infusion for between 4 and 24 hours, especially for at least 5, 6, 7, 8, 9, 10, 11, 12, 13, 14, or 16 hours and/or for less than 23, 22, 21, 20, 19, 18, 17, 16, 15, 14, 13, 12, 11, 10, 9 or 8 hours. They are preferably for infusion for around 8 hours. In embodiments of the invention the biologically inert fluid and/or the therapeutic agent may be for infusion over a period of up to 72 hours, preferably up to 48 hours.

The biologically inert fluid and/or the therapeutic agent may be for a once only administration, e.g. the CED catheter or catheters are implanted, the biologically inert fluid and the therapeutic agent are infused and the catheters are removed. Alternatively, the catheter or catheters may be chronically implanted. In this aspect of the invention, the biologically inert fluid and/or the therapeutically active agent may be infused by chronic-intermittent infusions. For example, the biologically inert fluid and/or the therapeutically active agent may be administered weekly, fortnightly, monthly, every six, eight, twelve or fifteen or more weeks. For example, a cycle of two or three days of infusions may be repeated every three months. Alternatively, they may be for administration in a series of cycles of infusions, with 6, 7, 8, 9, 10, 11 or 12 months between the end of a first cycle of infusions and the next cycle of infusions.

The CNS disorder may be a neurodegenerative disease, an enzyme deficient condition, a neuroinflammatory disease, an acquired neurological injury, or cancer.

Neurodegenerative diseases include dementia, Lewy body disease, Alzheimer's disease, Huntington's disease, Amyotrophic Lateral Sclerosis (ALS), Multiple System Atrophy, Spinal muscular atrophy, Friedreich's Ataxia, Huntington's disease, Parkinson's disease, Parkinson's plus syndromes, and Corticobasal degeneration.

Enzyme deficient conditions include Lysosomal Storage diseases, Tay Sachs Disease, Sandhoff Disease, Neuronal Ceroid Lipofuscinosis, Hunter Syndrome, Hurler disease and Gaucher's Disease.

Neuroinflammatory diseases include Multiple Sclerosis and prion diseases.

Acquired neurological injuries include stroke, traumatic brain injury or spinal cord injury. Spinal cord injury may be treated with motor cortex infusions of anterogradely transported vectors such as AAV5-GDNF or anterogradely and/or retrogradely transported neurotrophins such as brain-derived neurotrophic factor (BDNF), glial cell-derived neurotrophic factor (GDNF), fibroblast growth factor (FGF-2), neurotrophin-3 (NT-3) or insulin-like growth factor 1 (IGF-1) delivered to the motor or sensory cortex.

The cancer is typically brain cancer and may be characterised by the presence of primary or secondary brain tumours. The brain tumour may be an astrocytoma, such as glioblastoma multiforme (GBM), and may be diffuse intrinsic pontine glioma (DIPG).

In embodiments of the invention the CNS disorder maybe a neurological disorder, such as epilepsy.

The therapeutic agent may be selected from one or more of neurotrophins, gene therapies, enzymes, immune-therapy, SiRNAs, antisense oligonucleotides, chemotherapy, Auger electron emitters, immunotoxins, molecular targeted therapies, monoclonal antibodies, oncolytic viruses, viral vectors, chemotherapy agents, nanoparticles, such as gold or iron nanoparticles, and botulinum toxin.

The therapeutic agent may be administered in the form of a pharmaceutical composition, which may comprise any pharmaceutically acceptable carrier, adjuvant or vehicle. Pharmaceutically acceptable carriers, adjuvants and vehicles that may be used in the pharmaceutical compositions include, but are not limited to, ion exchangers, alumina, aluminium stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulphate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

The subject is preferably a mammal, more preferably a primate, especially a human and may be a paediatric or geriatric patient.

The present invention additionally provides methods for treating a CNS disorder, the methods comprising administering a biologically inert fluid and a therapeutically active agent to patient in need therefore, wherein the biologically inert fluid and the therapeutically active agent are administered via CED in accordance with the embodiments of the invention described above.

BRIEF DESCRIPTION OF THE DRAWINGS

The invention will now be described in detail, by way of example only, with reference to the figures.

EXAMPLES

Example 1

Delivery of Therapeutic Agents to the Frontal Lobe Cortex for the Treatment of Alzheimer's Disease, Amyotrophic Lateral Sclerosis, Friedreich's Ataxia, Huntington's Disease, Enzyme Deficiency Syndromes, Lysosomal Storage Diseases, Stroke Repair, Brain Injury, Focal Epilepsy and Other Neurological and Psychiatric Diseases (Intrinsic Depression and Schizophrenia)

There are a number of challenges in delivering therapeutic agents to the frontal lobe cortex due to its convoluted morphology and volume. Each frontal lobe cortex volume is approximately 135 cm$^3$ and constitutes 20% of the total cerebral cortex volume (Kennedy et al). To distribute a therapeutic agent to the deepest half of the cortex (which contains layer 5), assuming a Vd/Vi of 5:1, will require a Vi of 13.5 ml. Delivery of therapeutic agents exclusively to the cortex by CED is not feasible due to its convoluted morphology, but this can be achieved with subcortical white matter infusions. Infusions into the white matter will preferentially flow down white matter tracts as this is the path of least resistance. In a worst case scenario the frontal white matter will need to be filled in its entirety before a sufficient pressure gradient is established to drive the infusate into the grey matter. The total cerebral white matter volume is 390 cm$^3$ (Lüders et al), thus estimating the white matter volume of one frontal lobe to be 20% of the total cerebral white matter, its volume is 78 cm$^3$. The Vd/Vi for white matter is 2:1 so that 39 ml of infusate will have to be delivered in this example before a sufficient pressure gradient is established to drive the therapy into the cortical grey matter. Thus the total volume of infusate required to cover a frontal lobe will be 39 ml+13.5 ml=52.5 ml. If a catheter can deliver 7-10 ml per day (10-15 µL per minute for 12 hours) 5-7 catheters will be needed to fill this volume. Nevertheless in this instance only ⅓rd of the infused drug will be in the therapeutic target and the remaining ⅔rds will be ineffective and may cause unnecessary toxicity.

Treatment Method Proposed in the Present Invention:

An example of the method for delivering a therapeutic agent to the frontal lobe cortex is shown in FIGS. 1-6. Here three catheters for delivery of the therapeutic agent are implanted in a fan-shaped antero-posterior trajectory under the frontal cortex with their entry points at the frontal pole and each catheter tip is positioned beneath the motor cortex. A further catheter is implanted to deliver therapy in the sub-cortical white matter of the orbito-frontal cortex with a fronto-polar entry point. One catheter (yellow) for delivery of an inert fluid, preferably artificial CSF, is placed deep in the frontal white matter in an antero-posterior direction with an entry point at the frontal pole and distal end deep to the motor cortex.

Preferably the catheters are reflux resistant, stepped or recess-stepped catheters with adjustable step lengths to modulate the shape of the infused volume of distribution (suitable catheters are described WO03/077785). The catheters are surgically implanted with image guidance using stereotactic methods that are well established. For some indications, such as for viral vector delivery, the catheters may be implanted for one-off infusions and then removed. For treatments that require repeated infusions the catheters may be chronically implanted and infused periodically via a trans-cutaneous port as described WO2008/062173 and/or WO2011/098769. Alternatively subcutaneous pumps may be connected to individual catheters for chronic-intermittent infusions.

It is of note that the method described above of delivering therapeutic agents to the frontal cortical grey matter may be applied to the delivery of therapies to the cortical grey matter of the occipital, parietal, and temporal lobes or indeed of combinations thereof or to the whole brain including the cerebellum.

Example 2

Delivery of Viral Vectors that Undergo Anterograde Axonal Transport, Including AAV2, 5, 8, and 9 to the Motor Cortex for the Treatment of Amyotrophic Lateral Sclerosis (GDNF and/or VEGF Transgene), Spinal Cord Injury (GNDF and/or VEGF Transgene), Friedreich's Ataxia (Frataxin Transgene, and/or GNDF and/or VEGF Transgene), Spinal Muscular Atrophy (SMN1 Transgene, and/or GNDF and/or VEGF Transgene) and Multiple Sclerosis (GDNF).

Here three or more catheters for delivery of the therapeutic agent are implanted in a fan-shaped antero-posterior trajectory under the frontal cortex with their entry points at the frontal pole and each catheter tip is positioned beneath the motor cortex. Each catheter step length is adjusted so that the infusate is delivered beneath the motor and premotor cortex. Typically the catheter step length would be 5-20 mm. One or more catheters for delivery of an inert fluid, preferably artificial CSF, are placed deep to the subcortical catheters. These are positioned in the white matter in an antero-posterior direction with an entry point at the frontal pole and distal end deep to the motor cortex.

The subcortical catheters deliver the viral vector carrying the appropriate transgene in an inert diluent, such as aCSF, at a concentration that will be sufficient to transfect motor neurons in layer 5 of the cortex. Typically this is in the range of $1\times10^{12}$ VG/ml to $5\times10^{13}$ VG/ml. The rate of infusion is preferably between 5 and 15 µL per minute. A radio-opaque contrast agent such as Gadolinium-DTPA may also be co-infused with the vector. Inert fluid, preferably aCSF will be infused through the more deeply placed catheters at the same time as the therapeutic agent is infused, however, infusion of the latter may commence before commencing infusions of the therapy so that a pressure gradient is established that drives the flow of the vector when it is infused towards the cortex. Similarly when the therapy has been delivered, the continued infusion of aCSF would be desirable so that more of the vector is driven towards the cortex. The flow rate of the catheters infusing aCSF may be higher than the catheters infusing the therapy i.e. 10-15 µL/min verses 5-10 µL/min to increase the pressure gradient.

Example 3

Blocking the flow of infused therapies from entering critical brain volumes, e.g. the medulla when infusing the pons in DIPG. In this instance aCSF is infused into the critical structure to protect it from an influx of potentially toxic drug.

Example 4

Subcortical infusion to the sensory cortex with retrogradely transporting vectors including AAV5 may be used to deliver neurotrophins such as GDNF down the spinal cord to peripheral sensory neurons to treat peripheral sensory neuropathy.

Example 5—Bio-Distribution of AAV9-MCherry Delivered to the Motor Cortex of a Large Animal Model (Adult Romney Marsh Sheep)

Figure 1:
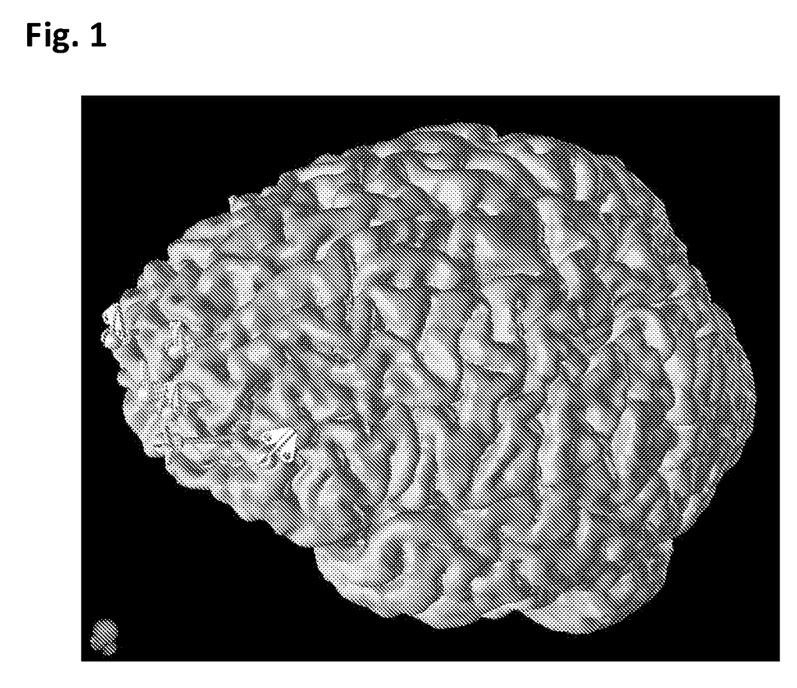
FIG. 1 shows a 3-dimensional perspective view of the brain with catheter entry points in the frontal poles.
Figure 2:
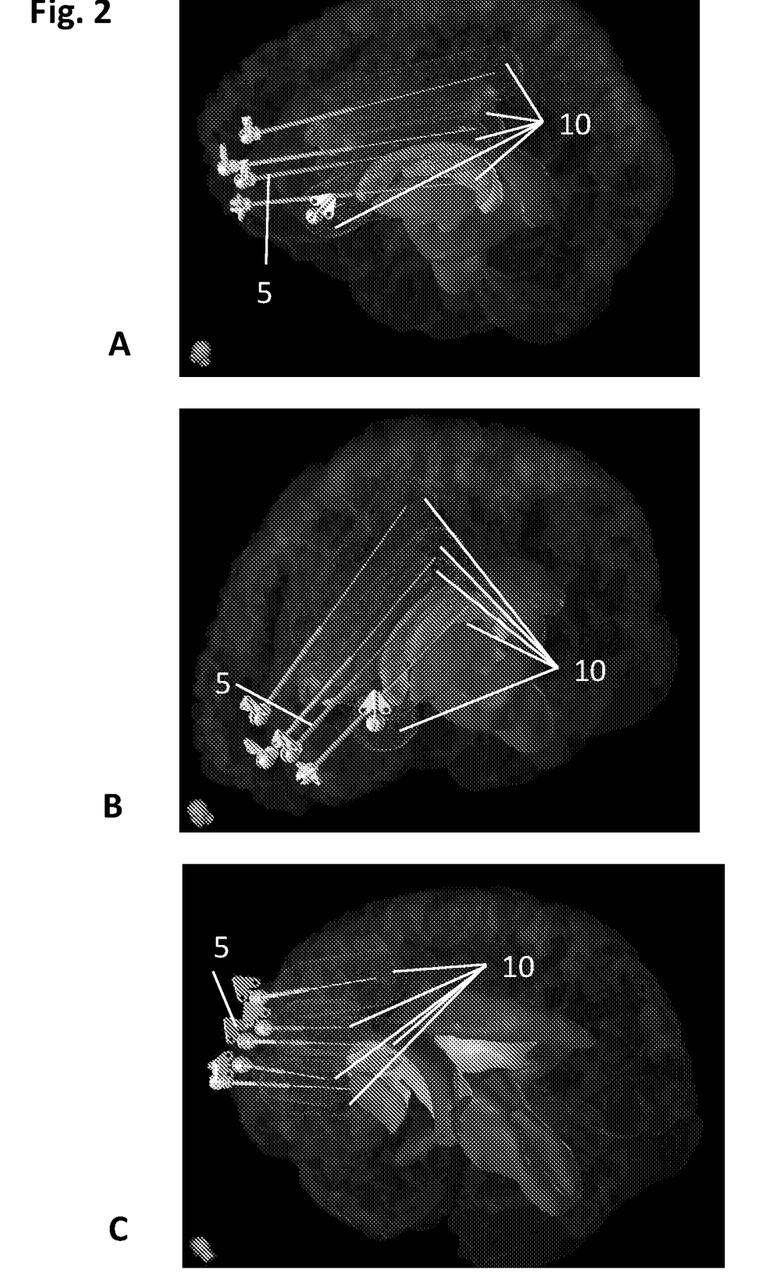
FIG. 2 shows a semi-transparent brain with three subcortical frontal catheters and a single orbito-frontal catheter for delivery of a therapeutic agent plus a deep white matter catheter (5) for delivery of a biologically inert fluid. The planned infusion volumes for the catheter are shown as ovoid volumes (10).
Figure 3:
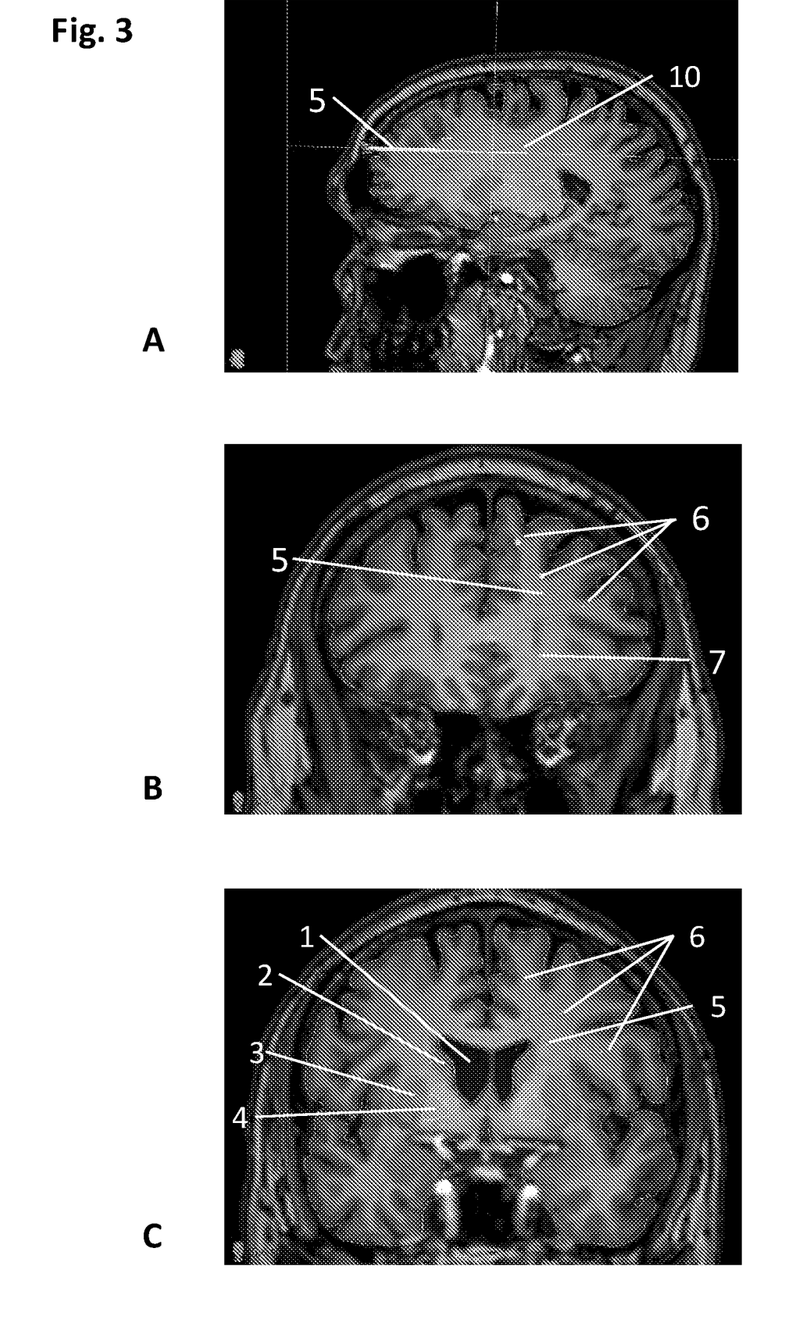
FIG. 3A shows a trajectory view of the frontal, deep white matter catheter (5) that is reconstructed in a sagittal plane through the head. The planned infusion volume of biologically inert fluid to be delivered by this catheter is shown in outline (10).
FIG. 3B shows a coronal section through the anterior frontal lobes with cross-sectional views of three subcortical catheters (6) and one orbito-frontal catheter (7) for delivering a therapeutic agent plus a cross-sectional view of a deep white matter catheter (5) for delivering a biologically inert fluid.
FIG. 3C shows a coronal section through the posterior frontal lobes with cross-sectional views of three subcortical catheters (6) for delivering a therapeutic agent plus a cross-sectional view of a deep white matter catheter (5) for delivering a biologically inert fluid. Labels indicate the lateral ventricle (1), the caudate nucleus (2), the putamen (3) and the globus pallidus (4).
Figure 4:
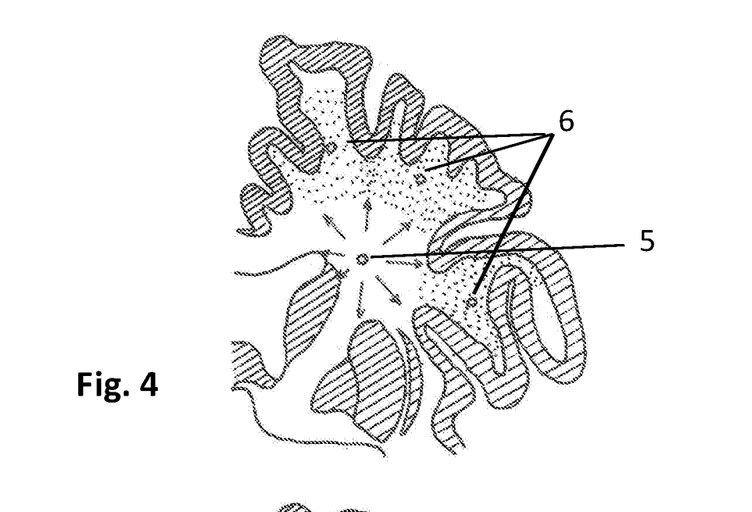
FIG. 4 shows a coronal section through the posterior frontal lobe (as per the MRI image FIG. 3C). Three subcortical catheters 6 and one deep white matter catheter 5 are implanted in an antero-posterior trajectory. The three subcortical catheters are delivering a therapeutic agent and the deep white matter catheter is delivering a biologically inert fluid.
Figure 5:
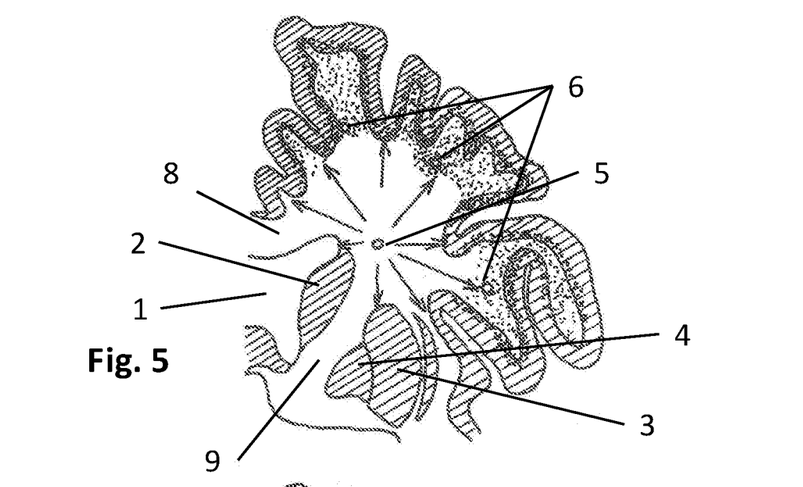
FIG. 5 shows the latter stages of the infusion with the deep white matter catheter 5 driving (as indicated by arrows) the therapy towards the cortical grey matter. Labelled are the lateral ventricle (1), the caudate nucleus (2), the putamen (3), the globus pallidus 4), the corpus callosum (8), and the internal capsule (white matter) (9).
Figure 6:
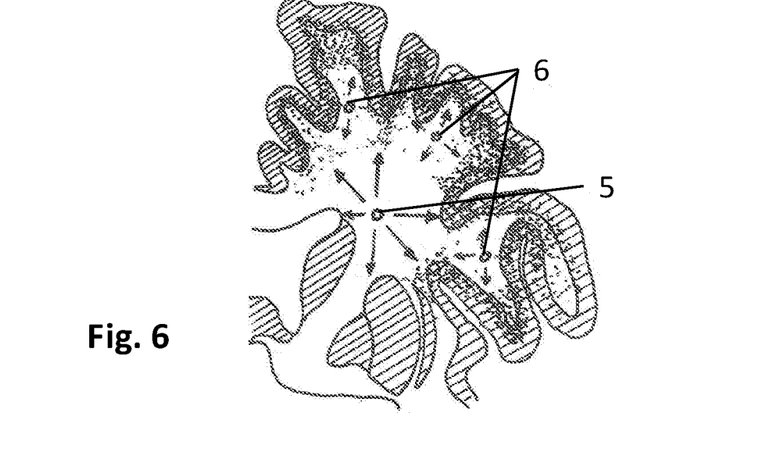
FIG. 6 shows an embodiment of the invention with the infusion of a biologically inert fluid following the infusion of the therapeutic agent in the subcortical catheters 6. In this instance this works in cooperation with the deep white matter infusion of biologically inert fluid 5 to further drive (as indicated by arrows) the therapeutic agent into the cortical grey matter.
Figure 7:
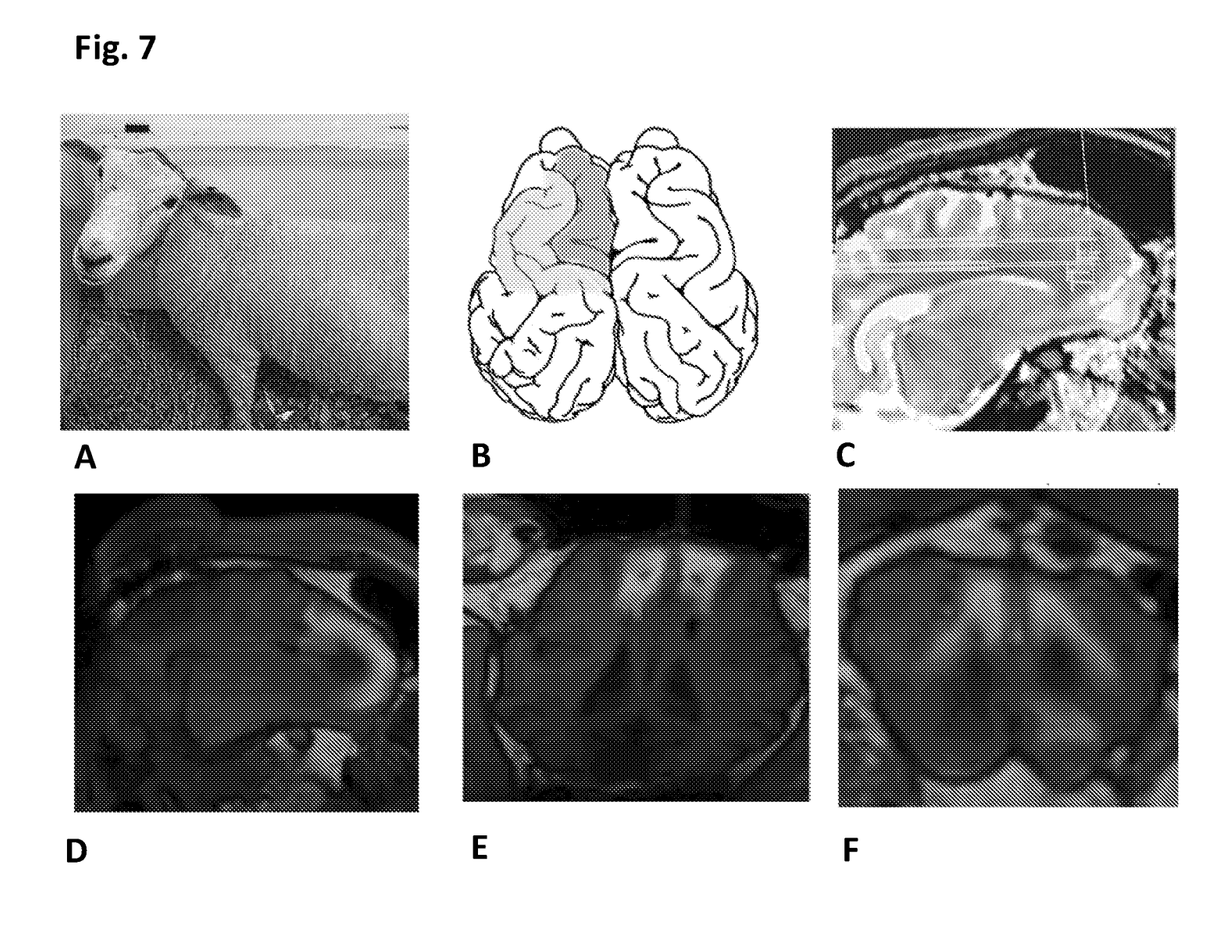
FIG. 7 shows (A) the sheep model used; (B) a schematic illustration of the position of the motor cortex in the brain (blue); (C) the position of catheters used for a test infusion of 500 µL of gadolinium to the sheep motor cortex (yellow catheter=aCSF; white catheter=contrast, i.e. gadolinium); (D) a post-infusion sagittal view of gadolinium distribution; (E) a post-infusion axial view of gadolinium distribution; and (F) a post-infusion coronal view of gadolinium distribution.

Method:

A Romney Marsh adult sheep (FIG. 7) was anaesthetised and its head fixed in a custom made head fixation device. T1 and T2 volumetric MRI images were acquired of the sheep's head with a radio-opaque fiducial fixed to the head frame. The trajectories of 4 implantable CED micro-catheters were planned from the MRI volumes using surgical planning software. The sheep's motor cortex occupies the medial aspect of the frontal lobe and 2 posterior to anterior catheter trajectories were planned for each hemisphere. These included a subcortical and a deep white matter catheter in a parallel orientation in each hemisphere with entry points in the parietal region (FIG. 7).

With reference to the fiducials visible on the MRI image volumes the surgical plan was co-registered with a CRW stereotactic frame (Radionics Inc. Mass.) that was attached to the sheep head fixation device. This then facilitated implantation of the catheters under stereotactic guidance. The catheters were connected to independent channels in a trans-cutaneous port.

Figure 8:
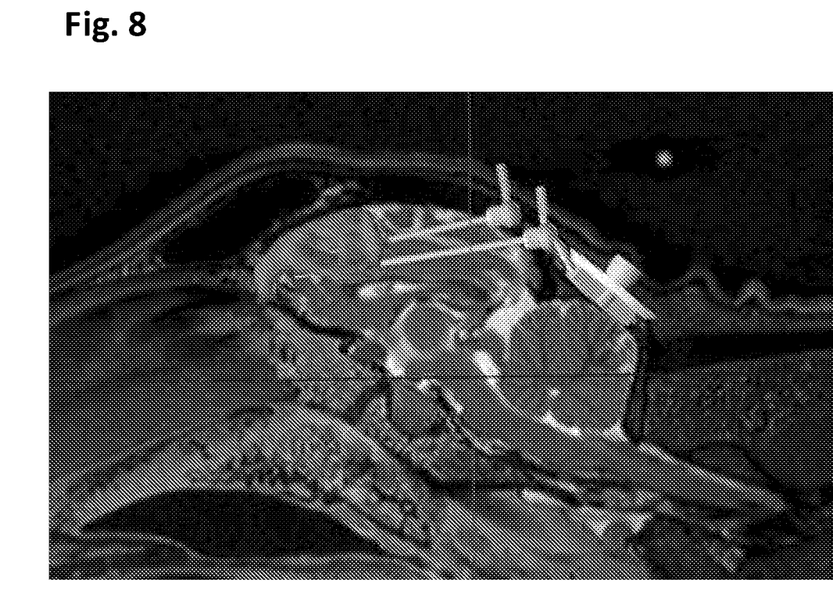
FIG. 8 shows a mid-sagittal T2 image of sheep brain with 3D reconstruction of the volume of distribution of 500 µl of infused gadolinium in the motor cortex (blue). The sub-cortical catheter that delivers the gadolinium is shown in yellow. Also shown are the deep white matter catheter (white) and the trans-cutaneous port located in the occipital bone. The volume of distribution/volume of infusion ratio (Vd/Vi)=4:1.

Prior to delivering AAV to the sheep motor cortex a test infusion of an equivalent volume of gadolinium (500 µL to each motor cortex) was first conducted to establish its volume of distribution. The infusions were carried with the sheep under general anaesthesia in an MRI scanner. Due to the convoluted morphology of the motor cortex, delivery of the gadolinium (and subsequently the vector) was achieved by infusing it into the subcortical white matter whilst simultaneously infusing artificial cerebrospinal fluid (aCSF) into the deep white matter, both at a flow-rate of 5 µL per minute. The pressure gradient created by infusing aCSF into the white matter drives the gadolinium or vector into the cortex. When the latter had been infused a further 500 µL of aCSF was delivered down each of the sub-cortical and deep white matter catheters at 5 µL per minute to further drive the gadolinium into the cortical grey matter (FIG. 8).

Having confirmed satisfactory motor cortical coverage with the test infusion of gadolinium the sheep was recovered and 1 week later underwent infusions of AAV9-CMV-MCherry (500 µL of $2.2\times10^{13}$ VG/ml) into the left motor cortex using the above described method.

The sheep was housed in a pen with other sheep for 6 weeks prior to being euthanized and perfusion fixated. The brain was cryopreserved and retained for histological analysis.

Histological Methods: The fixed brain was sectioned at 100 µm increments in the sagittal plane and from the level of the cerebral peduncles the pons and medulla were sectioned axially at 40 µm increments.

MCherry fluorescence was visualised using florescence microscopy.

Every $25^{th}$ section was processed for immunohistochemistry and H&E staining.

Results

1. Bio-Distribution of MCherry Florescent Protein Transgene in the Brain and Spinal Cord Following Infusion of AAV9-MCherry into the Left Motor Cortex.

Figure 9:
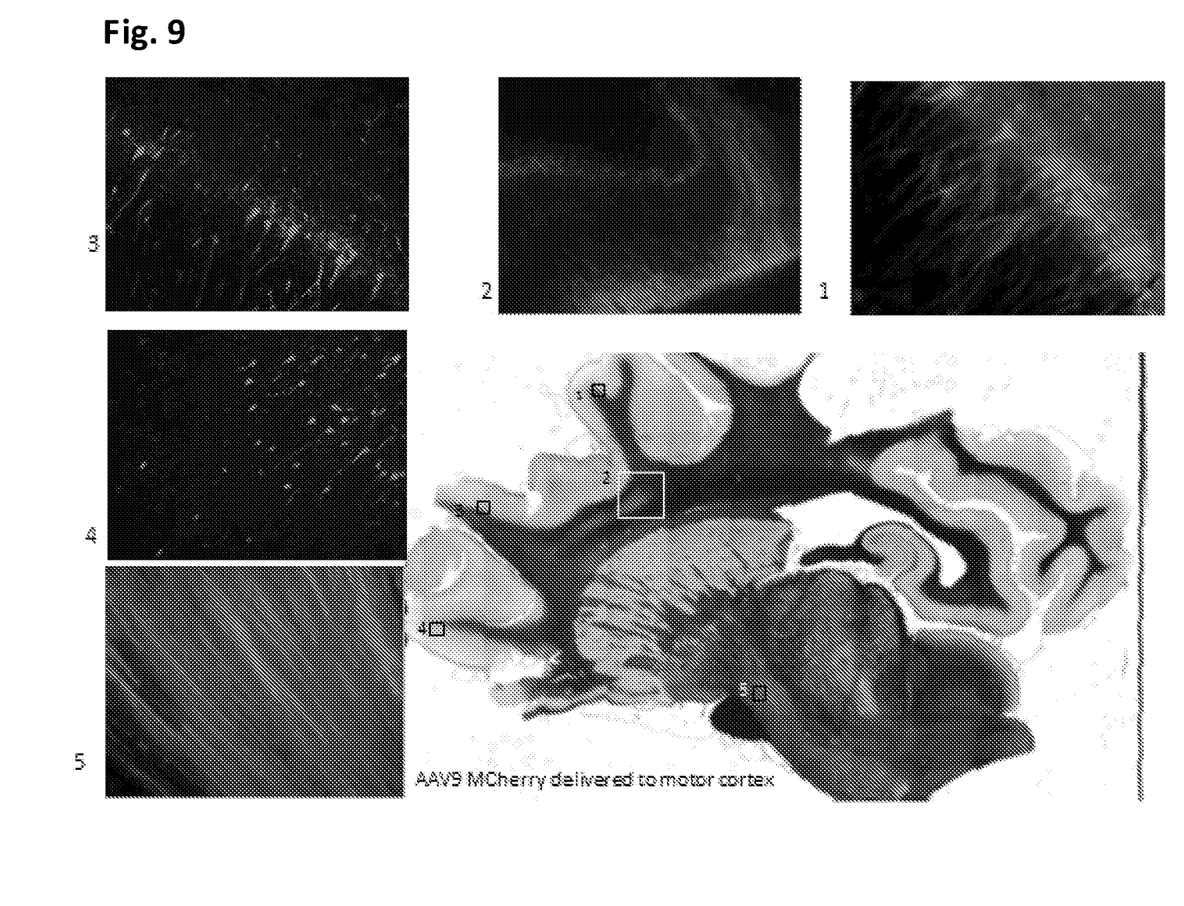
FIG. 9 shows a sagittal section of sheep brain post-infusion of AAV9-CMV-Mcherry to the motor cortex. MCherry fluorescence indicates transfection of primary motor neurons (pyramidal cells).

Brain:

MCherry fluorescence was observed throughout layer 5 of the motor cortex with pyramidal cells and the cortico-spinal tracts being strongly fluorescent (FIG. 9). Less intense fluorescence was observed throughout all layers of the cortex, being expressed in both neurons and glia.

Figure 10:
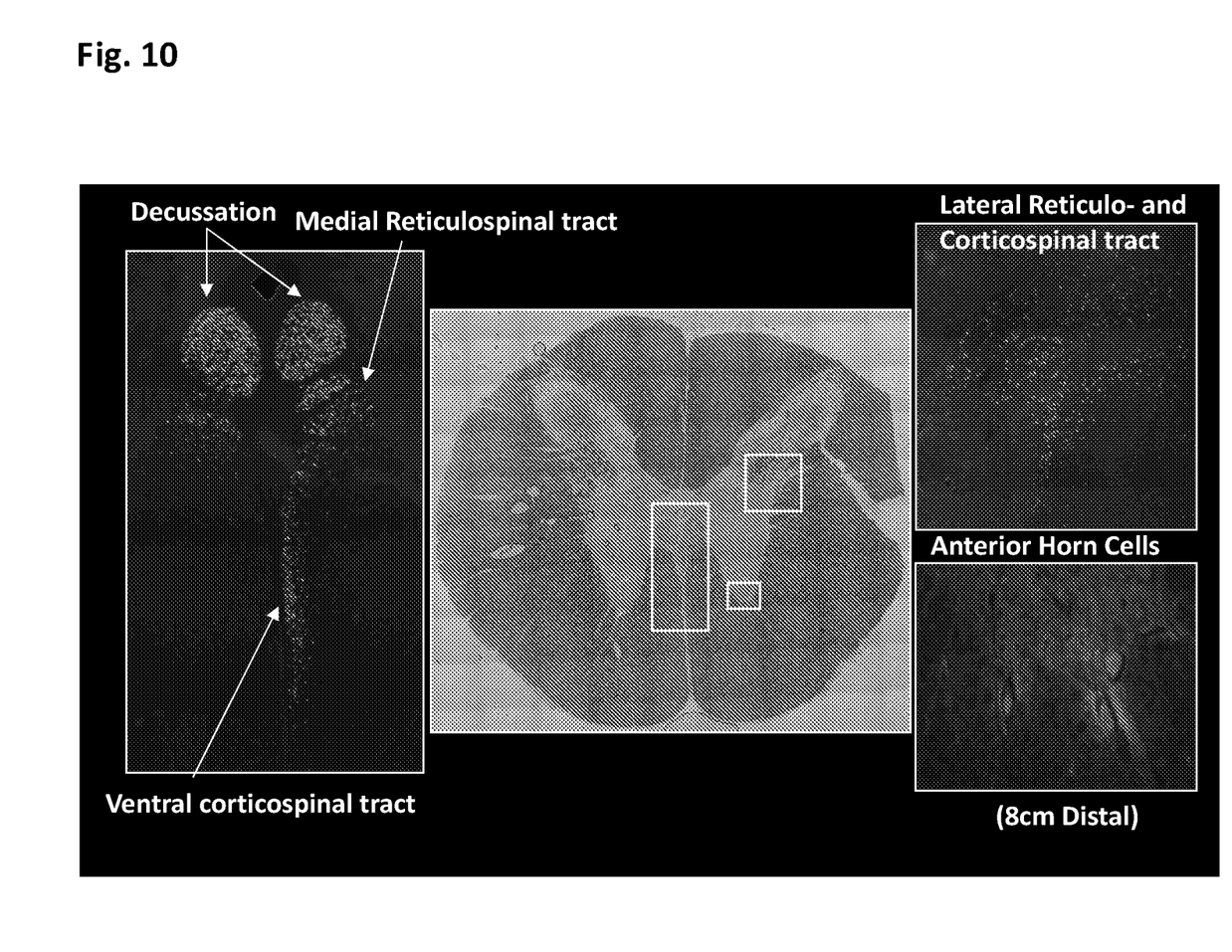
FIG. 10 shows anterograde transport of MCherry in the corticospinal and reticulospinal tracts and in the anterior horn cells of the sheep.

Spinal Cord:

Axial sections through the cervical spinal cord show anterograde transport of MCherry in the anterior and lateral corticospinal tracts as well as the ventral white commissure. MCherry is also seen in the medial and lateral reticulospinal tracts and anterior horn cells indicating trans-synaptic transfection of AAV9 (FIG. 10).

CONCLUSION

The present study demonstrates that it is possible to transfect the motor cortex and spinal cord by infusing a gene therapy vector and cargo into sub-motor cortical white matter of the brain and utilising a pressure gradient created by infusion of aCSF into white matter to drive the gene therapy vector and cargo into the cortex.

REFERENCES

Bobo R H, Laske D W, Akbasak A, Morrison P F, Dedrick R L, Oldfield E H. Convection-enhanced delivery of macromolecules in the brain. Proceedings of the National Academy of Sciences of the United States of America. 1994; 91 (6): 2076-2080.

Gill T, Barua N U, Woolley M, Bienemann A S, Johnson D E, S O'Sullivan, Murray G, Fennelly C, Lewis O, Irving C, Wyatt M J, Moore P, Gill S S. In vitro and in vivo testing of a novel recessed-step catheter for reflux-free convection-enhanced drug delivery to the brain. J Neurosci Methods. 2013 Sep. 30; 219 (1): 1-9.

Kennedy D N et al, Cerebral Cortex June 1998; 8:372-384

Lüders E, et al, NeuroReport Vol 13, 17, December 2002

Motion J P M, Huynh G H, Szoka Jr. FC, Siegel R A. Convection and Retro-convection Enhanced Delivery: Some Theoretical Considerations Related to Drug Targeting. Pharm. Res. 2011. 28:472-479

Panse S J, Fillmore H L, Chen Z J, Gillies G T, Broaddus W C. A novel coaxial tube catheter for central nervous system infusions: performance characteristics in brain phantom gel. J Med Eng Technol. 2010; 35 (7-8): 408-414.

The invention claimed is:

1. A method of treating a CNS disorder, the method comprising administering a biologically inert fluid and a therapeutic agent to a patient in need thereof, wherein:
    the therapeutic agent is infused into a brain of said patient via convection enhanced delivery (CED) using a catheter tip positioned into a subcortical white matter region of said brain, and
    the biologically inert fluid is infused into the brain via CED using a catheter tip positioned into a deep white matter region that is deeper than the subcortical white matter region, such that the biologically inert fluid drives the therapeutic agent to a cerebral cortex region of said brain.

2. The method of treatment according to claim 1, wherein the biologically inert fluid is infused simultaneously with the therapeutic agent, after infusion of the therapeutic agent, or both prior to and after infusion of the therapeutic agent.

3. The method of treatment according to claim 1, wherein the biologically inert fluid is selected from one or more of phosphate buffered saline (PBS) or artificial cerebrospinal fluid (aCSF).

4. The method of treatment according to claim 1, wherein the therapeutic agent is infused in the brain via an array of at least three catheters.

5. The method of treatment according to claim 4, wherein the array comprises at least one central catheter for administration of the biologically inert fluid.

6. The method of treatment according to claim 5, wherein the biologically inert fluid is infused through the central catheter subsequent to, or both prior to and subsequent to, infusion of the therapeutic agent.

7. The method of treatment according to claim 1, wherein the therapeutic agent and the biologically inert fluid are infused sequentially through a same catheter.

8. The method of treatment according to claim 4, wherein the catheters are selected from reflux resistant catheters, stepped catheters, or recessed step catheters.

9. The method of treatment according to claim 1, wherein the biologically inert fluid is infused at a flow rate of between 1 and 30 µL per minute.

10. The method of treatment according to claim 1, wherein the therapeutic agent is delivered to the cerebral cortex and a spinal cord.

11. The method of treatment according to claim 10, wherein the therapeutic agent is delivered to a frontal, parietal, temporal and/or occipital lobe of the cerebral cortex, or wherein the therapeutic agent is delivered to the whole cerebral cortex.

12. The method of treatment according to claim 10, wherein the therapeutic agent is delivered to a motor cortex, visual cortex, sensory cortex, associative cortex and/or auditory cortex.

13. The method of treatment according to claim 1, wherein the CNS disorder is selected from neurodegenerative diseases, enzyme deficient conditions, neuroinflammatory diseases, acquired neurological injuries, and neurological disorders.

14. The method of treatment according to claim 1, wherein the therapeutic agent is selected from neurotrophins, gene therapies, enzymes, immune-therapy, SiRNAs, antisense oligonucleotides, chemotherapy, Auger electron emitters, immunotoxins, molecular targeted therapies, monoclonal antibodies, oncolytic viruses, viral vectors, nanoparticles and botulinum toxin.

* * * * *